W. G. HYNDMAN.

Method of Securing Metal Plates to Structures.

No. 8,100. Reissued Feb. 26, 1878.

WITNESSES.

Nat E. Stephens.

R. S. Reeves

INVENTOR.

William G. Hyndman, per Chas. H. Fowler,

Attorney.

UNITED STATES PATENT OFFICE.

WILLIAM G. HYNDMAN, OF CINCINNATI, OHIO.

IMPROVEMENT IN METHODS OF SECURING METAL PLATES TO STRUCTURES.

Specification forming part of Letters Patent No. 191,763, dated June 12, 1877; Reissue No. 8,100, dated February 26, 1878; application filed September 7, 1877.

*To all whom it may concern:*

Be it known that I, WILLIAM G. HYNDMAN, of Cincinnati, in the county of Hamilton and State of Ohio, have invented certain new and useful Improvements in Method of Securing Metal Plates to Structures; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
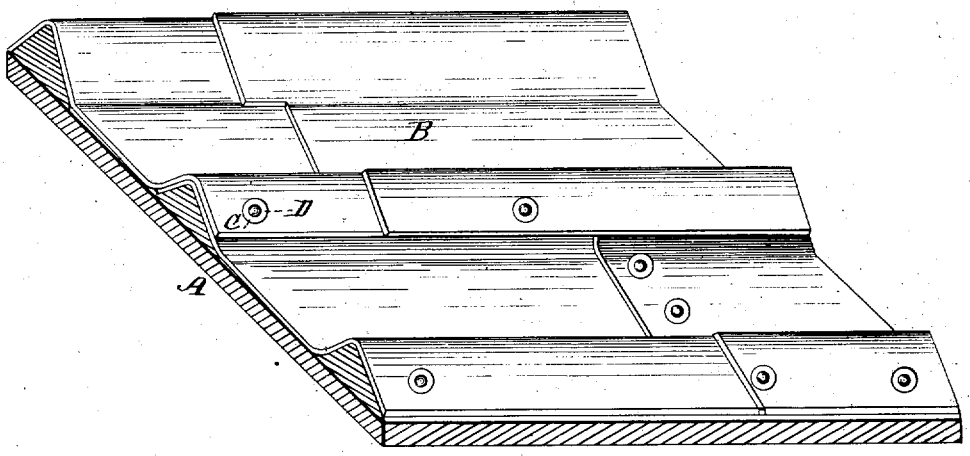
Figure 2:
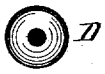
Figure 4:
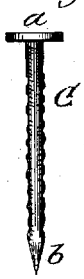
Figure 3:
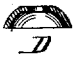

Figure 1 of the drawings is a representation of a section of a roof with metal plates connected thereto. Fig. 2 is a plan view of the washer. Fig. 3 is a vertical section of the same, and Fig. 4 is a view of the nail used in securing the metal plates to the roof or other structure.

This invention has relation to the means used for securing sheet-metal plates upon the roofs of houses and other places where such roofing is required.

Previous to my invention the great difficulty and objection to the fastenings used were the liability of the metal plates becoming torn, caused by the unevenness of the size of the nail, and the impossibility of forming a perfectly air and water tight joint around the head of the same; also, the ease and liability of the nail being withdrawn by the contraction and expansion of the metal.

The means heretofore employed, which resulted in the above difficulties, were the ordinary cut nail, having an imperfect head, and also, in connection therewith, a lead washer. This nail, as previously stated, would cut or tear the iron in puncturing its way through, and it had such an imperfect head as to make it impossible to form an air or water tight joint around the nail-head and nail-hole, leaving an aperture for the water to penetrate to the ragged edge of the sheet metal, thereby giving an opportunity for corrosion; and in the use of a washer of soft metal with a nail having so imperfect a head the pressure of the under side of the nail-head upon the washer, when the nail is driven home, would tear or split the washer, rendering it again impossible to form an air-tight and water-tight joint.

I therefore wish it understood that I do not desire to cover in my invention the above means of securing metal plates to structures, as the aim and purpose of the present invention is to remove, as far as possible, these difficulties; and the invention consists in the means of securing metal plates to structures by the use of a round wire nail, having its body or shank barbed or roughened, and terminating in a tapering or conical point, in connection with a washer of soft material.

In the accompanying drawings, A represents a section of a roof, and B the metal plates, connected and secured to the roof by the nail C and washer D. The nail C is made from wire drawn out through a gage, so that the wire will be of uniform thickness throughout, and the nail is barbed or roughened around its shank or body, and has a round head, *a*, and conical point *b*. One advantage of such a nail in securing metal plates to structures is the rapidity with which the sheet-metal plates may be secured to the roof, the sharp conical point of the nail readily penetrating the metal without its being necessary to first make the hole with a punch or other similar tool; and a further advantage is obtained in having the point sharp and of conical form, as the point will pass into the wood without tearing the fibers, it merely splitting or separating them, thereby allowing them, after the nail is driven home, to resume their natural position, and intertwine and brace themselves between the projecting edges or barbs formed upon the shank or body of the nail, firmly holding it in place.

In driving the nail home, the washer D, being composed of soft material, preferably of lead or other soft metal, accommodates itself to any unevenness of the surface of the metal plate; and the head of the nail being round, when embedded and incased in the soft material composing the washer, will press equally at all points thereon, thereby preventing the possibility of splitting it, which has been frequently the case in the use of the square or irregular formed heads of the nails now in use.

Having now fully described my invention, what I claim as new, and desire to secure by Letters Patent, is—

1. The herein-described means of securing metal plates to structures, which consists of a pointed wire nail, having its body or shank barbed or roughened, in connection with a washer of soft material, substantially as and for the purpose set forth.

2. The herein-described means of securing metal plates to structures, which consists of a pointed wire nail, having a round head, and its body or shank barbed or roughened, in connection with a washer of soft material, substantially as and for the purpose specified.

In testimony that I claim the foregoing I have hereunto set my hand this 27th day of August, 1877.

W. G. HYNDMAN.

Witnesses:
J. F. CURRIER,
ROBT. J. HYNDMAN.